US012747686B1

(12) United States Patent
Milanovic

(10) Patent No.: US 12,747,686 B1
(45) Date of Patent: Sep. 29, 2026

(54) EXHAUST GAS AFTERTREATMENT SYSTEM WITH TWO SCR CATALYSTS

(71) Applicant: FEV Group GmbH, Aachen (DE)

(72) Inventor: Rade Milanovic, Auburn Hills, MI (US)

(73) Assignee: FEV Group GmbH, Aachen (DE)

( * ) Notice: Subject to any disclaimer, the term of this patent is extended or adjusted under 35 U.S.C. 154(b) by 0 days.

(21) Appl. No.: 19/091,189

(22) Filed: Mar. 26, 2025

(51) Int. Cl.
*F01N 3/20* (2006.01)
*B01D 53/94* (2006.01)
*F01N 13/00* (2010.01)

(52) U.S. Cl.
CPC ......... *F01N 3/208* (2013.01); *B01D 53/9477* (2013.01); *B01D 53/9495* (2013.01); *F01N 13/009* (2014.06); *B01D 2258/012* (2013.01)

(58) Field of Classification Search
CPC ............ B01D 53/9477; B01D 53/9495; B01D 2258/012; F01N 3/208; F01N 3/2066; F01N 3/0814; F01N 3/035; F01N 13/009; F01N 11/00; F01N 11/002; F01N 11/007; F01N 2610/02; F01N 2560/00; F01N 2560/02; F01N 2560/06; F01N 2900/00; F01N 2900/04; F01N 2900/06; F01N 2900/14; F01N 2900/1402; F01N 2900/1404; Y02A 50/20; Y02T 10/12; Y02T 10/40
See application file for complete search history.

(56) References Cited

U.S. PATENT DOCUMENTS

| | | | | |
|---|---|---|---|---|
| 9,567,888 | B2 * | 2/2017 | Gupta | F01N 3/035 |
| 11,359,530 | B2 * | 6/2022 | Bergeal | F01N 3/2066 |
| 2007/0175208 | A1 * | 8/2007 | Bandl-Konrad | B01D 53/96 60/297 |
| 2022/0025798 | A1 * | 1/2022 | Swart | F01N 3/108 |
| 2022/0025802 | A1 * | 1/2022 | Webb | F01N 3/208 |
| 2022/0162971 | A1 * | 5/2022 | Montgomery | F01N 3/0842 |
| 2023/0034184 | A1 * | 2/2023 | Swart | F01N 3/208 |

FOREIGN PATENT DOCUMENTS

| | | |
|---|---|---|
| EP | 3486444 | 1/2022 |

* cited by examiner

*Primary Examiner* — Dapinder Singh
(74) *Attorney, Agent, or Firm* — Burris Law, PLLC

(57) ABSTRACT

An exhaust gas aftertreatment system for an internal combustion engine of a vehicle includes: an exhaust gas line, a main SCR catalyst, a diesel particulate filter arranged upstream of the main SCR catalyst, a first reducing agent injector associated with the main SCR catalyst, a close-coupled SCR catalyst, a second reducing agent injector associated with the close-coupled SCR catalyst, a sensor arrangement and a control unit. The control unit is set up to detect sensor signals of the sensor arrangement, to control components of the exhaust gas aftertreatment system and to determine the efficiency of the SCR catalysts. The efficiencies of the SCR catalysts are determined based on the sensor signals from the sensor arrangement and to modulate the efficiency of the close-coupled SCR catalyst as a function of the efficiency of the main SCR catalyst.

14 Claims, 6 Drawing Sheets

EXHAUST GAS AFTERTREATMENT SYSTEM WITH TWO SCR CATALYSTS

FIELD

Figure 1:
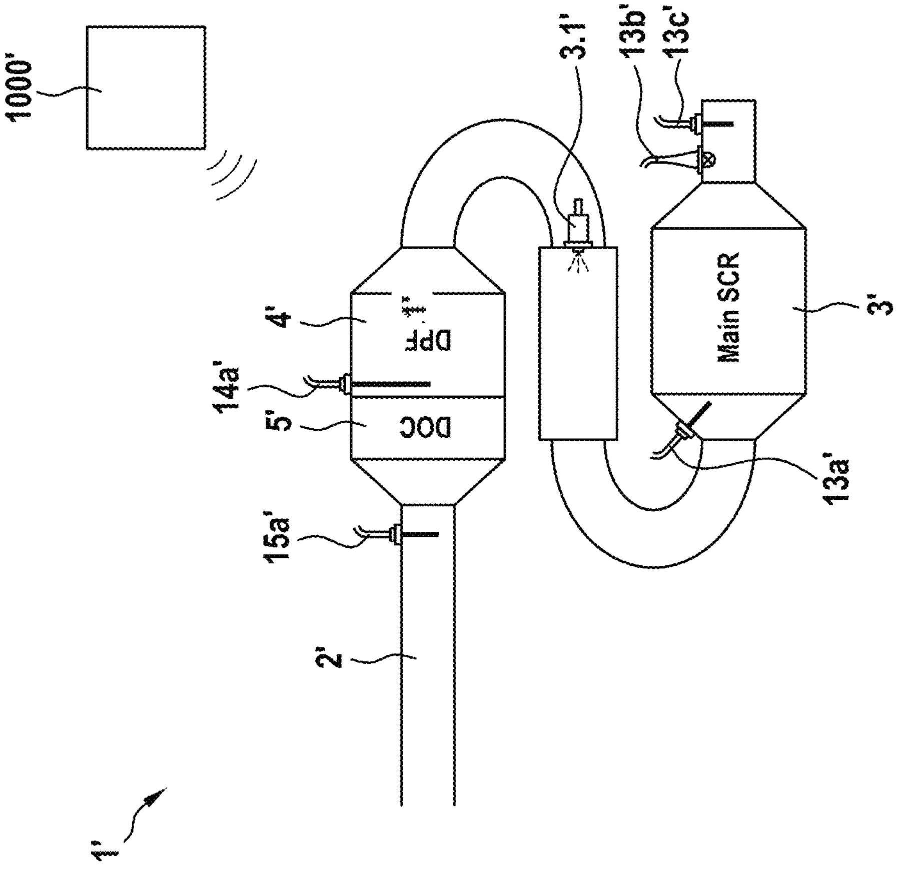

The present disclosure relates to an exhaust gas aftertreatment system with two SCR catalysts for an internal combustion engine and a method for operating the exhaust gas aftertreatment system.

BACKGROUND

The statements in this section merely provide background information related to the present disclosure and may not constitute prior art.

EP 3 486 444 B1 discloses an exhaust gas aftertreatment system and a method for its operation, wherein the exhaust gas aftertreatment system comprises two SCR catalysts, including a close-coupled SCR catalyst.

SUMMARY

This section provides a general summary of the disclosure and is not a comprehensive disclosure of its full scope or all of its features.

The invention comprises an exhaust gas aftertreatment system for an internal combustion engine driving a vehicle, wherein the system comprises an exhaust gas line, a main SCR catalyst, a diesel particulate filter arranged upstream of the main SCR catalyst and a first reducing agent injector associated with this catalyst and further comprises a close-coupled SCR catalyst, a second reducing agent injector associated with the close-coupled SCR catalyst, a sensor arrangement and a control unit, the control unit being set up to detect sensor signals from the sensor arrangement, to control components of the exhaust gas aftertreatment system, to determine the efficiencies of the SCR catalysts, the efficiencies of the SCR catalysts being determined on the basis of the sensor signals from the sensor arrangement, and to modulate the efficiency of the close-coupled SCR catalyst as a function of the efficiency of the main SCR catalyst.

The efficiency of SCR catalysts means their ability to convert NOx compounds in the exhaust gas of the combustion engine, for example, to nitrogen and water. The efficiency is mainly dependent on the amount of reducing agent, in particular $NH_3$, present or injected into the catalysts and the temperature of the catalysts. This efficiency is mainly controlled or modulated by varying the amount of reducing agent injected into the exhaust gas stream or the exhaust gas temperature. The efficiency is determined by the control unit using the sensor signals, for which, for example, characteristic maps and/or mathematical models can be used. Modulating of the efficiency means changing or adjusting the efficiency.

The invention enables increasingly stringent emission regulations to be met even under unfavorable operating conditions of the exhaust system, such as low temperatures, due to the presence of two SCR catalysts arranged in series and an arrangement of one of the catalysts close to the engine. Furthermore, the modulation of the efficiency of the close-coupled SCR catalyst depending on the efficiency of the main SCR catalyst, allows the invention to be used as a retrofit solution for existing exhaust gas aftertreatment systems, whereby the control of an existing SCR catalyst can remain largely untouched. An example of an existing system known from the prior art would be an SCR catalyst with associated means for determining its temperature and NOx emissions as well as a reducing agent injector and a diesel particulate filter. Such a system can be upgraded to the invention by adding the other components of the invention to it, whereby a control software located on a control unit can be upgraded by a simple software update.

Preferably, the sensor arrangement comprises a first NOx sensor downstream of the main SCR catalyst, a second NOx sensor downstream of the close-coupled SCR catalyst, a third NOx sensor upstream of the close-coupled SCR catalyst, a first temperature sensor assigned to the main SCR catalyst, a second temperature sensor assigned to the diesel particulate filter and a third temperature sensor assigned to the close-coupled SCR catalyst.

Such a sensor arrangement, in conjunction with the known injection quantity of reducing agent controlled by the control unit, can enable the determination of the efficiency of the SCR catalysts in a simple and reliable manner.

Preferably, the exhaust gas aftertreatment system comprises a diesel oxidation catalyst arranged upstream of the diesel particulate filter and the sensor arrangement comprises a fourth temperature sensor associated with the diesel oxidation catalyst. The diesel oxidation catalyst enables CO to be converted to $CO_2$ and NO to $NO_2$ by oxidizing the corresponding molecules with the residual oxygen in the exhaust gas. This can enable efficient exhaust gas purification and, in particular, efficient operation of the diesel particulate filter, as passive regeneration takes place in the filter at sufficient temperatures and $NO_2$ concentrations. Active regeneration and the associated fuel consumption and unnecessarily high temperatures in the exhaust system could therefore be used less frequently or even avoided altogether.

Preferably, the system comprises a heating element for heating the exhaust gas, which is arranged upstream of the close-coupled SCR catalyst and the sensor arrangement comprises a fifth temperature sensor associated with the heating element and wherein the control unit is set up to control the heating element in order to modulate the efficiency of the close-coupled SCR catalyst. This makes it possible to detect low temperatures in the exhaust system, for example during a cold start or prolonged operation of the engine at low engine speeds, to achieve or maintain the light-off temperature of the close-coupled SCR catalyst and to ensure effective exhaust gas purification.

Preferably, the control unit is further set up to modulate the efficiency of the close-coupled SCR catalyst as a function of the speed and/or acceleration of the vehicle and/or the engine operating parameters, wherein the engine operating parameters comprise an engine speed, an engine speed change, a torque and/or a torque change. The engine operating parameters can be detected and transmitted to the control unit by means known from the prior art and are not explained in detail here. This could provide the exhaust gas aftertreatment system with a predictive quality. For example, in the event of a drop in vehicle speed or deceleration and a sustained vehicle stop, the vehicle can be “assumed” to be shut down in the near future and the close-coupled SCR catalyst can be pre-loaded with reducing agent, which could ensure a sufficient catalyst efficiency when the engine is started after a shut-down. The same applies to continuous operation of the engine at idling speed or at low engine speed. In this case, a sufficiently high efficiency of the close-coupled SCR catalyst could be ensured by raising the exhaust gas temperature with the aid of a heating element, for example.

Preferably, the control unit is set up to modulate the efficiency of the close-coupled SCR catalyst as a function of the loading of the diesel particulate filter. This could enable efficient passive regeneration of the diesel particulate filter. For when the efficiency of the close-coupled SCR catalyst is reduced, an increased NOX mass flow leads to an increased regeneration efficiency Preferably, a downstream and an upstream pressure sensor or a differential pressure sensor are assigned to the diesel particulate filter. In this way, the loading of the filter could be determined particularly easily and effectively.

Preferably, the control unit is also set up to carry out reducing agent slip detection and to modulate the efficiency of the close-coupled SCR catalyst to that effect. Furthermore, the control unit is preferably set up to carry out a plausibility check of the signals from the NOx sensors by modulating the efficiency of the close-coupled SCR catalyst.

The arrangement of the close-coupled SCR catalyst allows the efficiency to be modulated under steady-state operating conditions, which can enable effective $NH_3$ slip detection downstream of the main SCR catalyst. Similarly, by specifically reducing the efficiency of the close-coupled SCR catalyst, essentially the same NOx concentrations can be generated upstream and downstream of the close-coupled SCR catalyst, which makes it particularly easy to check the plausibility of signals of sensors arranged accordingly.

The invention also comprises an exhaust aftertreatment system control method set up for operating the exhaust gas aftertreatment system according to the invention wherein the method comprises: detecting the sensor signals of the sensor arrangement by the control unit and determining the respective efficiencies of the catalysts on the basis of the sensor signals; operating the main SCR catalyst with the highest possible efficiency to minimize emissions; and modulating the efficiency of the close-coupled SCR catalyst as a function of the efficiency of the main SCR catalyst to reduce emissions.

To carry out the method, software or a computer program product can be stored on a non-volatile memory of the control unit which, when executed by a processor of the control unit, carries out the steps of the method.

The main SCR catalyst can be operated with the highest possible efficiency using any methods known in the prior art, such as map-based operation or with the aid of a sensor signal-based control or control loop. Mathematical models can also form the basis of the control or be integrated into it. Operating at the highest possible efficiency means, injection through the first reducing agent injector of a quantity of reducing agent so that NOx conversion is maximized at a given temperature of the main SCR catalyst. As already mentioned, this part of the control of the exhaust gas aftertreatment system may be based on a largely unchanged control of an existing system featuring a single SCR catalyst. Only parts of the control system that are counterproductive in terms of the invention, such as fuel injection to increase the temperature of the main SCR catalyst, may be removed or overwritten in an update.

Preferably, the control unit also records the vehicle speed, acceleration and/or engine operating parameters in the step for receiving the sensor signals of the sensor arrangement and modulates the efficiency of the close-coupled SCR catalyst as a function of at least one of these parameters in the efficiency adjustment step.

Preferably, the method comprises at least one of the following further steps: reducing the efficiency of the close-coupled SCR catalyst if the loading of the diesel particulate filter exceeds a threshold value; reducing the efficiency of the close-coupled SCR catalyst, if a plausibility check of the signals of NOx sensors is required; and increasing the efficiency of the close-coupled SCR catalyst in stationary operation, if a reducing agent slip detection of the main SCR catalyst is required.

These further steps provide the same technical advantages as the corresponding technical features of the exhaust gas aftertreatment system.

Further areas of applicability will become apparent from the description provided herein. It should be understood that the description and specific examples are intended for purposes of illustration only and are not intended to limit the scope of the present disclosure.

DRAWINGS

Figure 2:
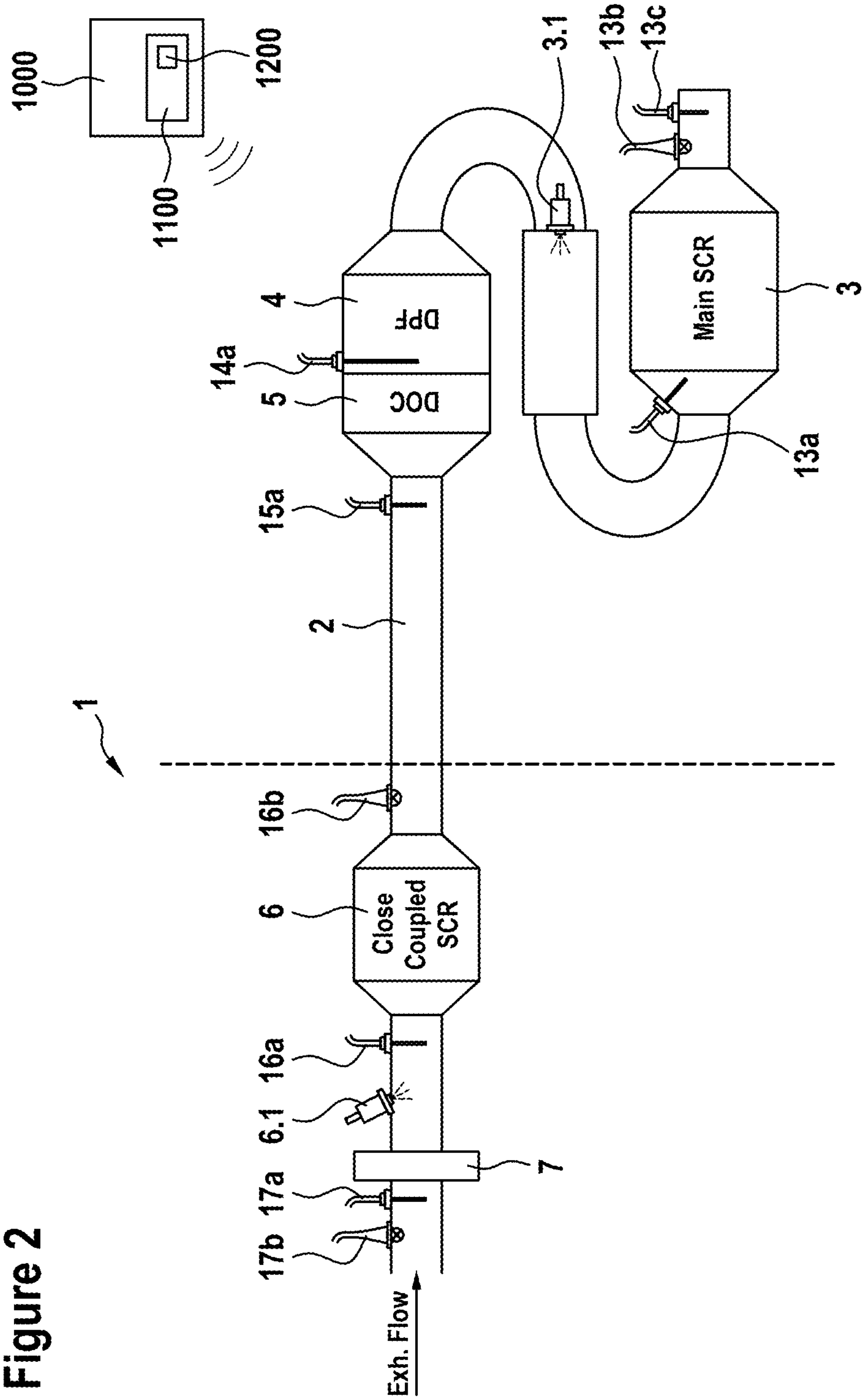
Figure 3:
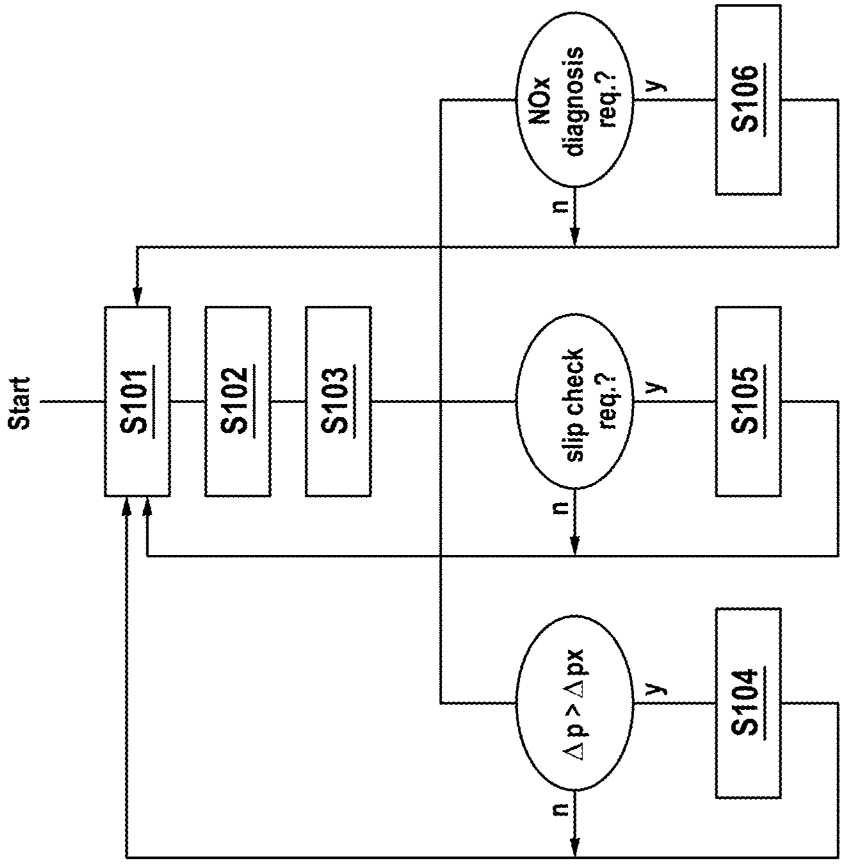
Figure 4:
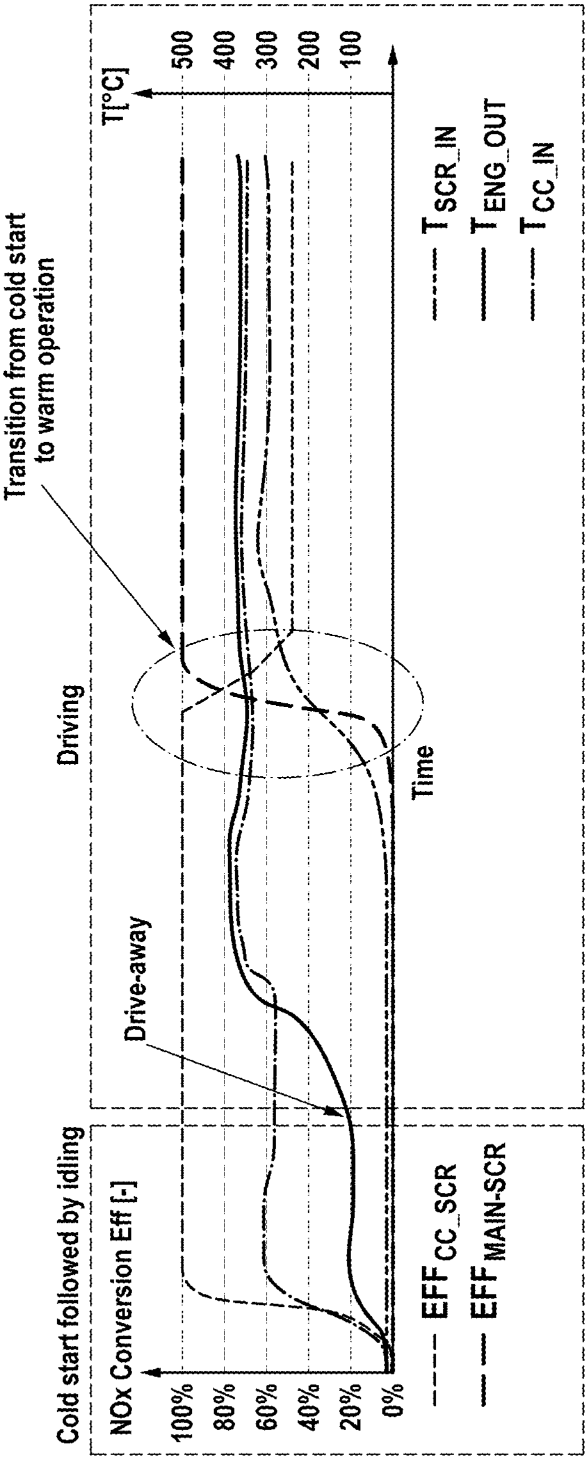
Figure 5:
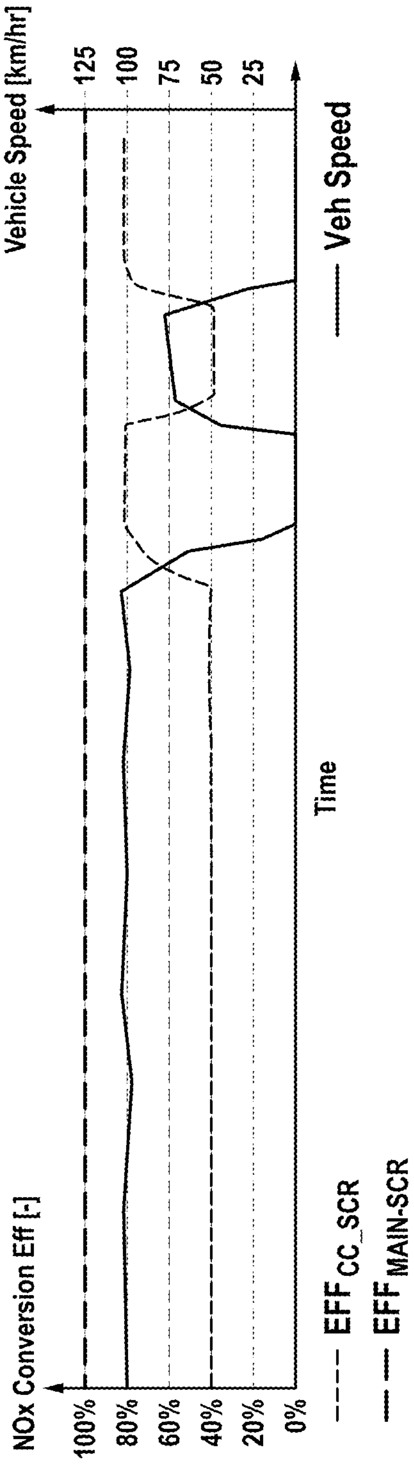
Figure 6:
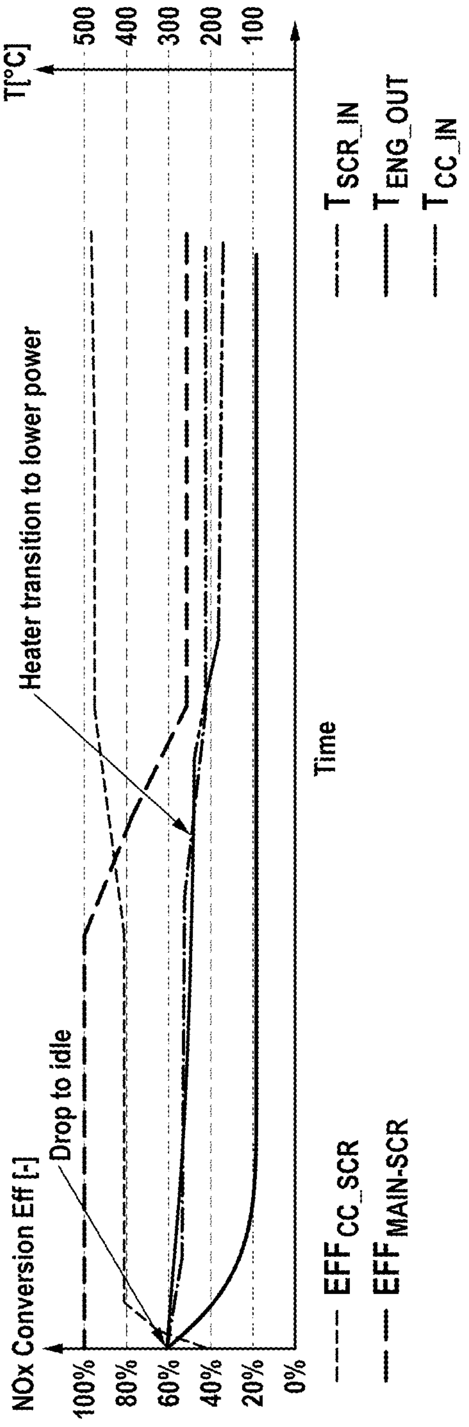

In order that the disclosure may be well understood, there will now be described various forms thereof, given by way of example, reference being made to the accompanying drawings, in which:

FIG. 1 depicts an exhaust gas aftertreatment system according to the state of the art;

FIG. 2 a preferred embodiment of the exhaust gas aftertreatment system according to the invention;

FIG. 3 a preferred embodiment of the method according to the invention for operating the exhaust gas aftertreatment system;

FIG. 4 a first operating scenario of the preferred embodiment of the exhaust gas aftertreatment system;

FIG. 5 a second operating scenario of the preferred embodiment of the exhaust gas aftertreatment system; and FIG. 6 a third operating scenario of the preferred embodiment of the exhaust gas aftertreatment system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an exhaust gas aftertreatment system 1' as known from the prior art. The system has an exhaust line 2' that conveys engine exhaust gases to the after-treatment components. Furthermore, the system has a diesel oxidation catalyst (DOC) 5' and a diesel particulate filter (DPF) 4', which are arranged upstream of a single main SCR catalyst 3', wherein a first reducing agent injector 3.1' is assigned to the main SCR catalyst 3'. A sensor arrangement 10' of the system 1' contains a fourth temperature sensor **15*a*' assigned to the DOC 5' and a second temperature sensor 14*a*' assigned to the DPF 4', as well as two first temperature sensors 13*a*', 13*c*' assigned to the main SCR catalyst 3' and a first NOx sensor 13*b*' assigned to the main SCR catalyst. The temperature sensors allow the temperature of the respective components to be determined. In combination with the NOx sensor 13*b*' and a further NOx sensor close to the engine exhaust (not shown) or a NOx raw emission model, the efficiency of the main SCR catalyst 3' can be determined. The main SCR catalyst 3' is operated by a control unit 1000'** with the highest possible conversion efficiency in order to minimize NOx emissions in the engine exhaust.

FIG. 2 shows an embodiment example of the exhaust gas aftertreatment system 1 according to the invention. In order to avoid unnecessary repetition, mainly the differences to FIG. 1 are discussed below. The exhaust gas aftertreatment system 1 comprises a close-coupled SCR catalyst 6 and a second reducing agent injector 6.1 assigned to it in order to inject an $NH_3$ solution upstream of the close-coupled SCR catalyst 6 into the exhaust line 2. In addition, a downstream second NOx sensor 16*b* and a third temperature sensor 16*a* are also assigned to the close-coupled SCR catalyst 6. A heating element 7 is arranged further upstream of the second reducing agent injector 6.1, as well as a fifth temperature sensor 17*a* and a third NOx sensor 17*b*. A differential pressure sensor (not shown) is assigned to the DPF 4, which can be used to determine the loading of the DPF. In an alternative embodiment, the loading of the filter can be calculated using a mathematical model, for ex-ample.

The control unit 1000 receives the signals from all sensors of the sensor arrangement 10 as well as other sensors (not shown), such as sensors for measuring the vehicle speed and sensors for measuring the torque and engine speed. Furthermore, the control unit 1000 is configured for controlling the individual components of the exhaust gas aftertreatment system 1, such as the heating element 7 and the reducing agent injectors 6.1, 3.1. In addition, the control unit 1000 is set up to deter-mine the individual NOx conversion efficiencies of the respective SCR catalysts 3, 6, whereby the efficiencies are determined using the signals from the sensor arrangement 10. The efficiency of the main SCR catalyst 3 $Eff_{mainSCR}$ is determined using the temperature of this catalyst $T_{mainSCR}$, the amount of reducing agent injected and the ratio of the NOx concentration downstream and upstream the catalyst 3; the same applies to the efficiency of the close-coupled SCR catalyst 6 $Eff_{ccSCR}$. The efficiencies are determined using well-known mathematical functions; in alternative embodiments, they can be determined using maps.

The control unit 1000 is equipped with a non-volatile storage medium 1100 on which a computer program 1200 is stored which, when executed by a processor (not shown) of the control unit 1000, executes the preferred embodiment of the method according to the invention. The preferred embodiment of the method according to the invention is illustrated in FIG. 3.

The method begins with a step S101, in which the control unit 1000 receives the sensor signals of the sensor arrangement 10 and also signals representing the vehicle speed, acceleration, torque and engine speed and determines the efficiencies $Eff_{ccSCR}$ and $Eff_{mainSCR}$ of the catalysts. In a step S102, the main SCR catalyst 3 and the associated reducing agent injector 3.1 are controlled in such a way that the efficiency $Eff_{mainSCR}$ is maximized. In the subsequent step S103, the efficiency of the close-coupled SCR catalyst is modulated as a function of the efficiency of the main SCR catalyst and the vehicle speed, acceleration, and engine speed in order to re-duce the emissions even further, if necessary. This means that the efficiency $Eff_{ccSCR}$ is increased, if a non-negligible NOx concentration is measured downstream of the main SCR catalyst 3 or if a non-negligible NOx emission is expected due to the engine operating parameters, efficiencies or vehicle speed and acceleration. If, on the other hand, the main SCR catalyst is sufficient to eliminate the NOx emissions, the efficiency $Eff_{ccSCR}$ is reduced to a minimum value. The modulation of the efficiency $Eff_{ccSCR}$ will be explained in more detail below with reference to FIGS. 4 to 6.

Steps S101 to S103 are performed continuously during operation of the system 1. The preferred embodiment of the method further comprises executing steps S104, S105 and S106 if the prerequisites for these steps are met. Steps S104-S106 can be prioritized relative to each other as desired if prerequisites for more than one step are fulfilled. Step S104 is carried out if the control unit 1000 detects a differential pressure Δp that exceeds a threshold value Δpx, which indicates that the DPF 4 is exceedingly loaded. In step S104, the efficiency $Eff_{ccSCR}$ is reduced in order to increase the NOx concentration at DOC 5 and DPF 4, which results in improved passive regeneration of the DPF 4. If the temperature at the DOC 5 and DPF 4 is too low for sufficient passive regeneration, the control unit 1000 can control the heating element 7 to increase the exhaust gas temperature. Otherwise, the control unit 1000 can also cause active regeneration of the DPF 4 by injecting fuel into the exhaust tract.

The control unit 1000 executes step S105, if detection of NH3 slip downstream of the main SCR catalyst 3 is required. For this purpose, the efficiency $Eff_{ccSCR}$ is briefly increased during steady-state operation of the engine, for example at a constant engine speed and sufficient temperature of the main SCR catalyst $T_{mainSCR}$. If this control step results in a drop in the signal from the first NOx sensor 13*b*, the detected signal is attributable to NOx emissions, otherwise to an $NH_3$ slip. If an $NH_3$ slip is detected, suitable countermeasures can be taken, e.g. a reduction in the efficiency of either of the SCR catalysts 3, 6.

The control unit 1000 executes step S106 if a plausibility check of the signals of the second 16*b* or third NOx sensor 17*b* needs to be carried out, for example as part of an OBD diagnosis. For this purpose, the control unit 1000 briefly reduces the efficiency $Eff_{ccSCR}$ to zero. As a result, the NOx concentration upstream and downstream of the close-coupled SCR catalyst 6 have to be approximately identical. This allows for a particularly simple and effective sensor signal plausibility check.

FIGS. 4 to 6 provide a more detailed explanation of the modulation of the efficiency $Eff_{ccSCR}$ in step S103 by way of describing selected operating scenarios.

FIG. 4 is attributable to a cold start scenario. As the temperature $T_{mainSCR}$ is very low and the efficiency $Eff_{mainSCR}$ is close to zero, the control unit 1000 maximizes the heating power of the heating element 7 and controls the second reducing agent injector 6.1 in such a way that an efficiency $Eff_{ccSCR}$ close to 100% is achieved. As soon as the temperature of the exhaust gas near the engine exhaust and the temperature of the close-coupled SCR catalyst TCC approach in value, the heating pow-er is reduced and as soon as the main SCR catalyst 3 reaches its operating temperature, the control unit 1000 reduces $Eff_{ccSCR}$ while $Eff_{mainSCR}$ is maximized.

FIG. 5 shows the operation of system 1 at a sufficient operating temperature $T_{main\text{-}SCR}$. The control unit keeps the efficiency $Eff_{ccSCR}$ low, as the NOx emissions can be eliminated by relying on the main SCR catalyst 3, and to avoid NH3 slip. A vehicle (not shown) comprising the system 1 moves at a certain speed and the control unit 1000 continuously receives its speed and acceleration signals. If the vehicle speed drops significantly, the control unit 1000 increases the loading of the close-coupled SCR catalyst 6 with $NH_3$ and thus $Eff_{ccSCR}$, wherein the NHs injection amount in-creases as a consequence of more vehement deceleration. If the vehicle accelerates again while the exhaust system 1 is warmed up, $Eff_{ccSCR}$ is reduced again. Such modulation is performed in anticipation of a possible shutdown of the engine when the vehicle comes to a halt. Without preloading of the close-coupled SCR catalyst 6 with reducing agent, the efficiency of this catalyst could otherwise be too low during a cold start and cause increased NOx emissions.

FIG. 6 shows the operation of system 1 with the engine running at idling speed for a certain period of time. Due to the drop of the engine speed to idling speed, which is detected by the control unit 1000, the temperature of the engine exhaust gas drops. This is also reflected in the signal originating from the fifth temperature sensor 17*a*. As a consequence, the control unit 1000 activates the heating element 7 to keep the temperature TCC sufficiently high and increases the efficiency $Eff_{ccSCR}$ to compensate for the falling NOx conversion ratio of the main SCR catalyst 3. While idling operation continues, the control unit 1000 reduces the heating power so that only the close-coupled SCR catalyst 6 maintains the light-off temperature and $Eff_{ccSCR}$ is maximized. In this way, electrical energy can be saved and sufficiently high NOx conversion can be achieved for the overall system 1.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An exhaust gas aftertreatment system for an internal combustion engine of a vehicle, the exhaust gas aftertreatment system comprising:

an exhaust gas line;

a main SCR catalyst;

a diesel particulate filter arranged upstream of the main SCR catalyst;

a first reducing agent injector associated with the main SCR catalyst;

a close-coupled SCR catalyst;

a second reducing agent injector associated with the close-coupled SCR catalyst;

a sensor arrangement; and a control unit configured to detect sensor signals from the sensor arrangement to control components of the exhaust gas aftertreatment system and to determine an efficiency of the main SCR catalyst and an efficiency of the close-coupled SCR catalyst, wherein the control unit is configured to:

determine the efficiency of the main SCR catalyst and the efficiency of the close-coupled SCR catalyst based on the sensor signals of the sensor arrangement, operate the main SCR catalyst at a highest possible efficiency to minimize emissions, and modulate the efficiency of the close-coupled SCR catalyst as a function of the efficiency of the main SCR catalyst to further reduce the emissions.

2. The exhaust gas aftertreatment system according to claim 1, wherein the sensor arrangement comprises:

a first NOx sensor downstream of the main SCR catalyst;

a second NOx sensor downstream of the close-coupled SCR catalyst;

a third NOx sensor upstream of the close-coupled SCR catalyst;

a first temperature sensor associated with the main SCR catalyst;

a second temperature sensor associated with the diesel particulate filter; and a third temperature sensor associated with the close-coupled SCR catalyst.

3. The exhaust gas aftertreatment system according to claim 1, further comprising a diesel oxidation catalyst arranged upstream of the diesel particulate filter, and the sensor arrangement comprises a fourth temperature sensor associated with the diesel oxidation catalyst.

4. The exhaust gas aftertreatment system according to claim 1, further comprising a heating element for heating an exhaust gas, which is arranged upstream of the close-coupled SCR catalyst, and the sensor arrangement comprises a fifth temperature sensor associated with the heating element, and wherein the control unit is configured to control the heating element in order to modulate the efficiency of the close-coupled SCR catalyst.

5. The exhaust gas aftertreatment system according to claim 1, wherein the control unit is configured to modulate the efficiency of the close-coupled SCR catalyst as a function of at least one of a speed of the vehicle, acceleration of the vehicle and engine operating parameters, wherein the engine operating parameters comprise at least one of an engine speed, an engine speed change, a torque and a torque change.

6. The exhaust gas aftertreatment system according to claim 1, wherein the control unit is configured to modulate the efficiency of the close-coupled SCR catalyst as a function of loading of the diesel particulate filter.

7. The exhaust gas aftertreatment system according to claim 6, wherein the sensor arrangement comprises a first pressure sensor arranged upstream and a second pressure sensor arranged downstream of the diesel particulate filter, by means of the signal of which the control unit determines the loading of the filter.

8. The exhaust gas aftertreatment system according to claim 1, wherein the control unit is configured to carry out reducing agent slip detection and to modulate the efficiency of the close-coupled SCR catalyst to that effect.

9. The exhaust gas aftertreatment system according to claim 1, wherein the control unit is configured to carry out a plausibility check of the signals from NOx sensors by modulating the efficiency of the close-coupled SCR catalyst.

10. A method for operating an exhaust gas aftertreatment system according to claim 1, the method comprising:

receiving the sensor signals of the sensor arrangement by the control unit and determining the respective efficiencies of the catalysts based on the sensor signals, operating the main SCR catalyst at a highest possible efficiency to minimize emissions, modulating the efficiency of the close-coupled SCR catalyst as a function of the efficiency of the main SCR catalyst in order to reduce emissions.

11. The method according to claim 10, wherein the receiving the sensor signals of the sensor arrangement by the control unit comprises additionally receiving, by the control unit, signals representing at least one of a speed of the vehicle, an acceleration and engine operating parameters, and the modulating the efficiency of the close-coupled SCR catalyst comprises modulating the efficiency of the close-coupled SCR catalyst as a function of at least one of the speed of the vehicle, the acceleration and the engine operating parameters.

12. The method according to claim 10, further comprising reducing the efficiency of the close-coupled SCR catalyst if loading of the diesel particulate filter exceeds a threshold value.

13. The method according to claim 10, further comprising increasing the efficiency of the close-coupled SCR catalyst in a stationary operation, if a reducing agent slip detection of the main SCR catalyst is required.

14. The method according to claim 10, further comprising reducing the efficiency of the close-coupled SCR catalyst, if a plausibility check of the signals of NOx sensors is required.

* * * * *